June 11, 1968　　　　　D. J. NORTON　　　　　3,387,677
AUTOMATED MILKER

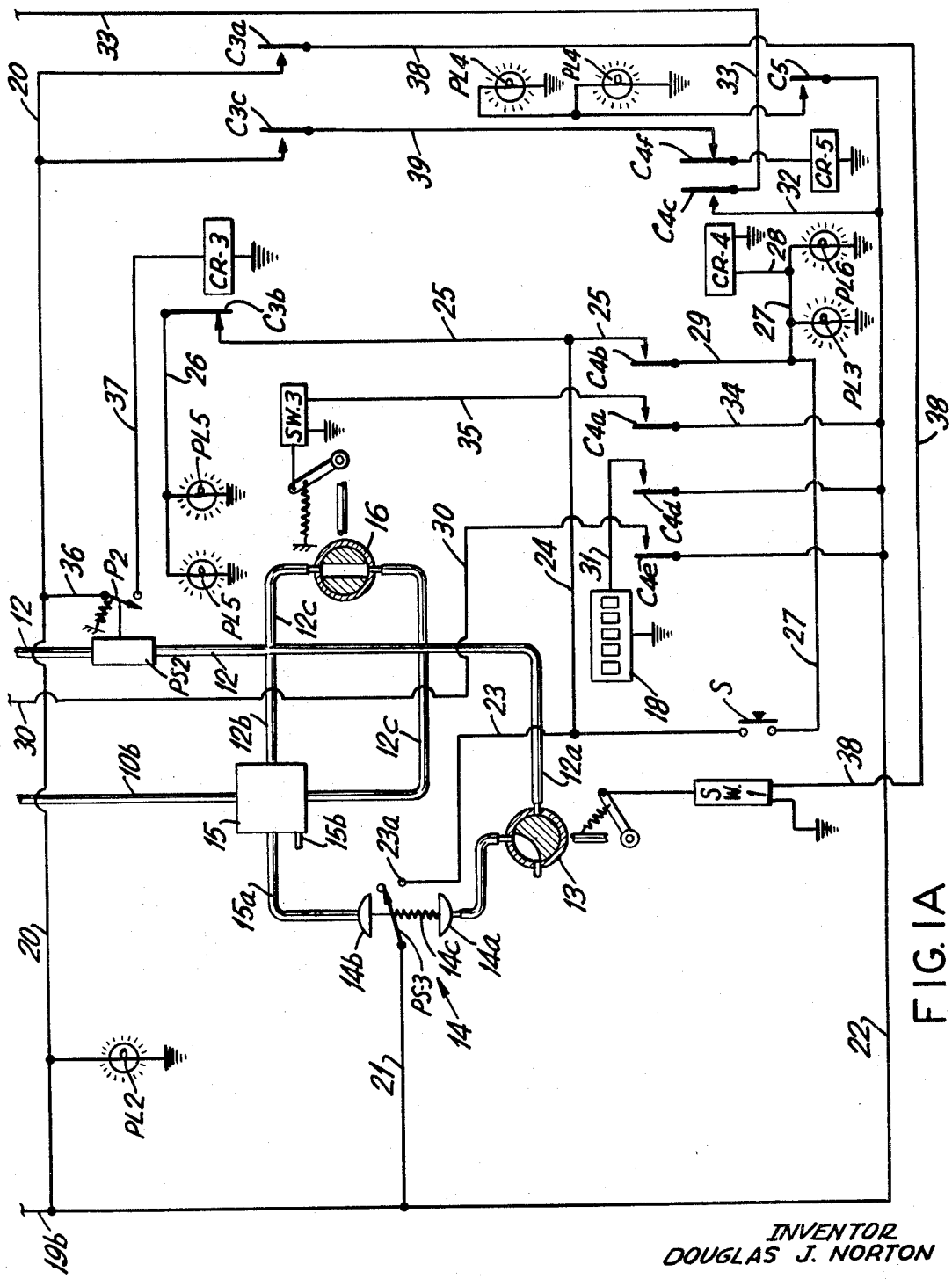

Filed Dec. 21, 1966　　　　　　　　　　3 Sheets-Sheet 3

INVENTOR
DOUGLAS J. NORTON

BY
Davis, Hoxie, Faithfull & Hapgood
ATTORNEYS

United States Patent Office 3,387,677
Patented June 11, 1968

3,387,677
AUTOMATED MILKER
Douglas J. Norton, Red Hook, N.Y., assignor to The De Laval Separator Company, Poughkeepsie, N.Y., a corporation of New Jersey
Filed Dec. 21, 1966, Ser. No. 603,553
20 Claims. (Cl. 177—68)

ABSTRACT OF THE DISCLOSURE

The milk receiver of an automatic milking unit is supported on a balance beam which tilts forward as the receiver fills with milk from the teat cups. An indicating element such as a switch is to be actuated upon completion of the milking; and for this purpose the balance beam is operatively connected to means for actuating the indicating element in response to substantial cessation of the forward tilting and while the beam is free to continue such tilting.

Disclosure

Figure 1:
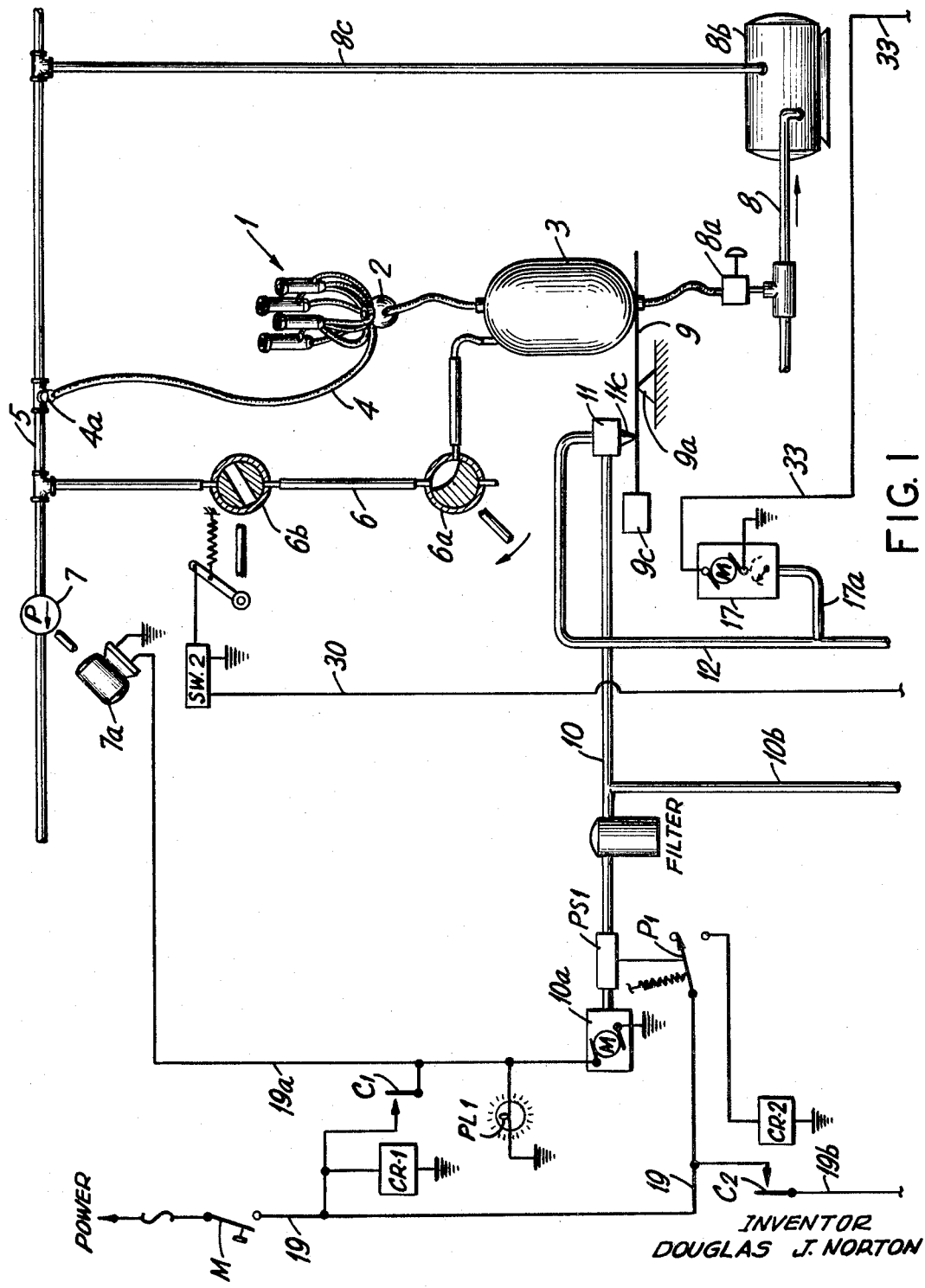

Milking systems in common use comprise a plurality of milker units each having a set of teat cups, a pulsator for operating the teat cups, and a receiver into which milk is delivered from the teat cups. During milking, the milker units are connected to a common vacuum pipe line for placing the respective receivers under vacuum and for applying vacuum intermittently to the teat cups under control of the respective pulsators. In many systems, the milker units are also connected to a common milk pipe line or bulk tank, also placed under vacuum, for withdrawing milk from the respective receivers after recording the milk weight.

In the use of such systems, it is the general practice for the dairy personnel to transfer the teat cups of each milker unit from one cow to another until an entire herd has been milked. However, a major obstacle to efficient use of the system has been the difficulty in determining when the milking of each cow has been completed, as this determination usually requires inspections of each of the various units from time to time during each of its operations. Unless the teat cups of each unit are transferred quite promptly to another cow upon completion of a milking operation and emptying of the receiver, the time required to milk the herd is prolonged; and excessive delay in removing the teat cups from a fully milked cow may be injurious to her.

An object of the present invention is to provide accurate and reliable means for sensing when a milker unit has completed a milking operation, thereby giving a warning signal and/or automatically effecting an operation desired upon completion of milking.

According to the present invention, the receiver of the milker unit is supported on a balance beam so that the latter tilts forward due to increased weight on the beam as the receiver is filled with milk from the teat cups; and the beam is connected to means, which may be pneumatic, for actuating an indicating element in response to substantial cessation of the forward tilting but while the beam is free to continue such tilting. The actuating means preferably include two devices exerting on the indicating element opposing forces which change in the same direction (increase or decrease) under control of the beam as it tilts forward during the milking; but whereas one of these devices substantially maintains its force upon cessation of this tilting, the second device substantially changes its force in response to such cessation and thereby causes the force tending to actuate the indicating element to become the predominant force. The response of the second device to cessation of the forward tilting may be delayed by a member which is adjustable, so that the indicating element is actuated with an adjustable delay following such cessation.

The indicating element when actuated may give a direct indication that milking is completed, or it may be a switch or other control element for operating a remote signal or for initiating one or more operations automatically upon completion of the milking. As a result, the milking of a herd may be effected more rapidly and with a substantial saving in labor.

Preferably, a recorder is operated by the actuating means to record the forward tilting of the beam and therefore the weight of the milk received in each milking; and a recording timer operable at the start of each milking is stopped by actuation of the indicating element upon completion of the milking. Thus, the milking performance of each cow is recorded. Also, means are preferably provided for sensing and indicating that the milk receiver has been emptied after a milking and that the milker unit is ready for another milking.

Figure 2:
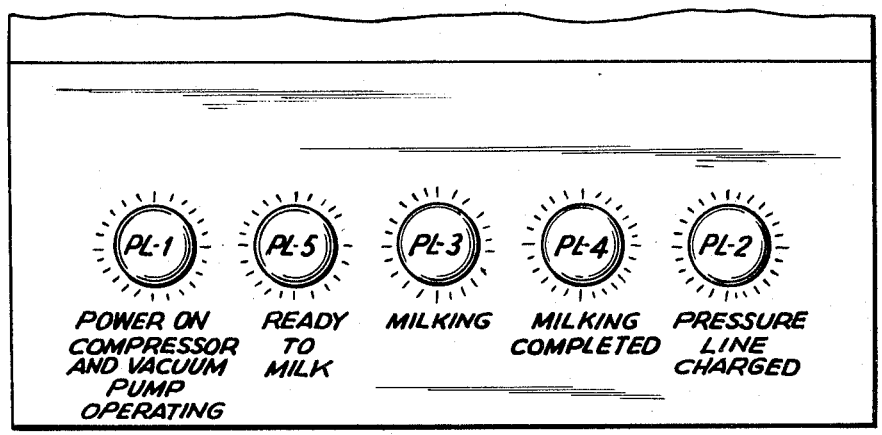
Figure 3:
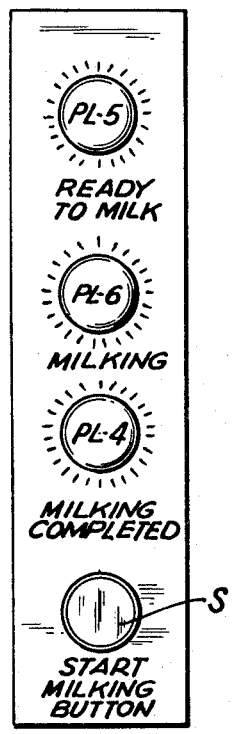
Figure 4:
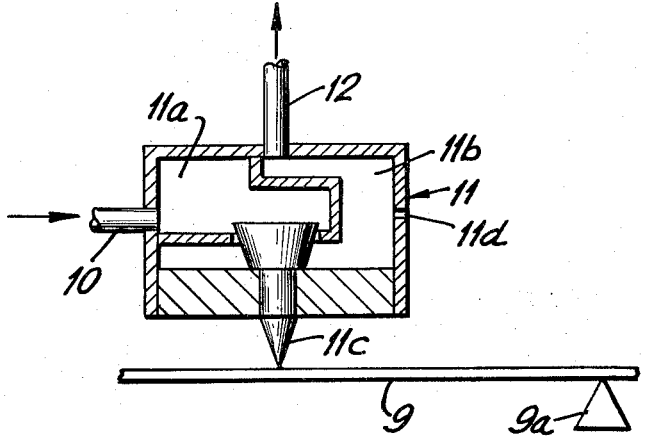

These and other features of the invention may be better understood by reference to the accompanying drawings, in which:

FIGS. 1 and 1A supplement each other to provide a schematic view of a milker unit provided with a preferred form of the invention; and FIGS. 2 and 3 are face views of panels at the master console and the milking station, respectively, showing the signal devices illustrated in FIGS. 1 and 1A;

FIG. 4 is a vertical sectional view of a simplified form of the beam-actuated valve shown in FIG. 1.

Referring to FIG. 1, the milker unit there shown comprises a set of teat cups 1 having their milk tubes connected through a milk claw 2 to a jar 3 forming a milk receiver. The pneumatic tubes of the teat cups are connected through a separate passage of the claw 2 to a hose 4 which in turn is connected through a pulsator 4a to a vacuum pipe line 5. The milk receiver 3 is also connected to vacuum line 5 through a hand-operated valve 6a, a duct 6 and an automatically operated valve 6d. During milking, a solenoid SW2 is energized to hold valve 6b open so as to connect duct 6 to the vacuum line, and valve 6a is in the position illustrated to connect receiver 3 to the duct 6, whereby the receiver is placed under vacuum. On completion of milking, solenoid SW2 is automatically deenergized to close valve 6b, and thereafter the valve 6a is turned clockwise to vent the receiver to atmosphere so as to allow discharge of the milk through the bottom of the receiver. The pipe line 5 is maintained under vacuum by a vacuum pump 7 operated by an electric motor 7a.

It will be understood that the vacuum line 5 will normally service a number of milker units similar to that described and operated in the usual manner, each unit having a valve (not shown) by which its pulsator 4a and hose 4 may be disconnected from the vacuum line incident to transferring the teat cups from one cow to the next. Also, the bottom of the receiver 3 of each milker unit is connected through a valve 8a to a milk pipe line 8 common to all of the units and, as shown, leading to a closed bulk tank 8b, the latter being maintained under vacuum by a pipe 8c leading to the vacuum line 5. After completion of milking and venting of the receiver at valve 6a, valve 8a is opened so as to empty the receiver into the milk line 8. To prepare for the next milking, valve 8a is reclosed and valve 6a is returned to its illustrated position.

The milk receiver 3 is supported on one end of a balance beam 9 which is pivoted intermediate its end on a fulcrum 9a. A weight 9c is adjustable on the other end of beam 9 so as to balance the weight of the empty receiver 3. As milk enters the receiver 3 during the milking operation, the increased weight on balance beam 9 causes the latter to tilt clockwise (forward) about fulcrum 9a, so that the maximum degree of forward tilting at the end of the milking will correspond to the final weight of milk received from the cow.

An indicating element PS–3, shown as a switch, is to be actuated to an open position (as illustrated) from its closed position engaging a contact 23a, when the milking operation is completed. Such actuation is effected by means operatively connected to the balance beam 9 and responsive to cessation of the forward tilting of this beam, it being understood that the beam will cease to tilt only when the cow has been completely milked so that the milk weight in receiver 3 is no longer increasing.

The means for actuating the indicating element PS–3 comprise a source of pneumatic pressure including a pipe 10 supplied by a compressor 10a and which terminates in a valve 11 for bleeding compressed air into a pipe line 12, whereby the latter is maintained under a variable pressure lower than the substantially constant pressure in pipe 10. This valve includes a valve member 11c operated by the end of balance beam 9 opposite the receiver 3; and when the beam is in its neutral position corresponding to the weight of the empty receiver 3, the valve maintains in pipe line 12 a base pressure considerably lower than the pressure maintained in pipe 10. For example, if the compressor 10a is regulated to maintain a pressure of 20–25 p.s.i. in pipe 10, a base pressure of 3 p.s.i. may be maintained in pipe line 12 by valve 11 when receiver 3 is empty. However, as beam 9 tilts forward incident to filling of receiver 3, the valve member 11c is raised to increase the throughflow area of the air-bleeding passage and thereby increase the pressure in pipe line 12. A valve suitable for this purpose is the Model 405 "Force Transmitter" made by Moore Products Company of Spring House, Pa., and which functions as a variable pressure regulator. In the example given above, it will vary the pressure in pipe line 12 from the aforesaid base pressure of 3 p.s.i. to a pressure of about 15 p.s.i., depending upon the position of balance beam 9, and will maintain the pressure substantially constant at any given position of the balance beam.

A simplified form of the valve 11 is shown in FIG. 4 and comprises a chamber 11a to which pipe 10 of the pressure source leads. The valve member 11c is slidable vertically with a close fit in the base of the valve housing and in its lowermost position allows compressed air to flow at a minimum rate into a chamber 11b communicating with pipe line 12. The latter chamber is vented at 11d so that this minimum flow rate maintains the previously mentioned base pressure of 3 p.s.i. in chamber 11b and pipe line 12. As valve member 11c is raised by forward tilting of beam 9, it gradually increases the flow rate from chamber 11a to chamber 11b and thus gradually increases the pressure in pipe line 12, and vice versa.

Pipe line 12 has a branch 12a connected through valve 13 to a device 14a forming the "low" side of a pressure differential switch 14, the switch element itself being the indicating element PS–3. Valve 13 is controlled by a solenoid SW1 which, when de-energized, holds the valve in the illustrated position for closing the pipe branch 12a and venting the "low" side 14a of the pressure differential switch to atmosphere. Upon energizing of solenoid SW1, the valve is actuated to disconnected the low side 14a from atmosphere and connect it to pipe branch 12a.

Another branch 12b of pipe line 12 forms an inlet to a derivative unit 15, to be described in more detail presently; and a third branch 12c of pipe line 12 leads through a valve 16 to another inlet of the derivative unit. Valve 16 is controlled by a solenoid SW3 which, when deenergized, holds this valve in the position illustrated so that the derivative unit has two inlets communicating with pipe line 12. Upon energizing of solenoid SW3, valve 16 is actuated to close the branch pipe 12c so that only one inlet of the derivative unit 15 is connected to pipe line 12. Another inlet of derivative unit 15 is maintained through pipe 10b at the relatively high pressure in pipe 10 of the pressure source. The outlet of derivative unit 15 is connected through pipe 15a to a device 14b forming the "high" side of the pressure differential switch 14.

With atmospheric pressure prevailing in pipe 10 and pipe line 12, as when the actuating means have not been prepared for use, switch PS–3 is held in its raised position by biasing member 14c of the pressure differential switch 14. However, with valves 13 and 16 positioned as shown, and with the relatively high operating pressure in pipe 10, the derivative unit 15 quickly releases to the high side 14b of pressure differential switch 14 a pressure sufficient to actuate switch element PS–3 to its downward or closed position against contact 23a, since the low pressure side 14a is now ventered to atmosphere through valve 13. This condition will prevail after solenoid SW3 is energized to close valve 16, since the second low pressure inlet 12c to the derivative unit 15 is provided only to insure a rapid closing of the pressure differential switch 14 when its low side 14a is first vented to atmosphere. However, when solenoid SW1 is energized to connect low side 14a to pipe branch 12a, switch element PS–3 will remain in its closed position only while the pressure in pipe line 12 continues to increase. That is, as long as this pressure is increasing, the derivative unit 15 releases a slightly higher pressure (due to its direct connection to compressor line 10) to the high side 14b of the pressure differential switch; but as soon as the pressure in pipe line 12 levels off due to discontinuation of the milk flow into receiver 3, the pressure released by derivative unit 15 to the high side 14b will decrease relative to the pressure on the low side 14a, thereby causing the biasing member 14c to actuate switch element PS–3 to its open position.

Derivative units functioning as described in connection with unit 15 are well known. An example is Model 59 DH "Derivative Unit" made by Moore Products Company, Spring House, Pa. The latter unit is provided with a member 15b for adjusting the orifice which bleeds off pressure in outlet 15a when the pressure in inlet 12b levels off; and by adjusting the member 15b, it is possible to adjust the small delay with which switch PS–3 is actuated to its open position in response to cessation of the forward tilting of beam 9. The pressure differential switch 14 may be of any conventional design.

A weight recorder 17 has a marking stylus which is pneumatically operated through pipe connection 17a to the pipe line 12. The chart propulsion motor of recorder 17 is energized throughout each milking operation, as will be described in more detail presently, so that the recorder makes a permanent record of the weight of milk entering the receiver 3 and sensed by the pressure in pipe line 12. This recorder may be of any conventional design, such as Model 5310 Recorder made by Moore Products Company of Spring House, Pa. An electrically operated milking timer 18 is also energized throughout each milking operation, as will be described more fully hereafter, and provides a permanent record which may be used in conjunction with the weight record provided by recorder 17.

To prepare the milker unit for operation, a master switch M is closed to connect primary power line 19 to the power source and thereby energize a relay CR–1 so as to close its contact C1. As a result, the motor 7a for the vacuum pump and the motor of compressor 10a are energized through wire 19a which is now connected to power line 19; and signal lamp PL–1, also connected to wire 19a, is energized at the console panel (FIG. 2) to indicate to the operator that the motors for the vacuum pump and compressor are operating.

When the pressure in source pipe 10 builds up to 20–25 p.s.i., it actuates a pressure switch PS–1 to shift its switch blade P1 to the closed position, thereby energizing a relay CR–2 by connecting it to power line 19. As a result, contact C2 of relay CR-2 is closed and connects power line 19 through line 19b to wires 20, 21 and 22. The resulting power in wire 20 energizes signal lamp PL-2 at the console panel (indicating that the pneumatic pressure lines are charged); and wire 20 also connects power line 19 to the blade P2 of pressure switch PS-2 and to one side of each of the switches C3a and C3c of a relay CR-3. Pressure switch PS-2 is operated by the pressure in pipe line 12 so as to close its switch blade P2 at a pressure of about 3.5 p.s.i., the blade being open at a pressure below about 3.5 p.s.i.

Through wire 21, blade PS-3 of pressure differential switch 14 is connected to power line 19 upon the aforementioned closure of relay switch C2. Wire 22, on closure of relay switch C2, connects the power line to one side of switch C5 of a relay CR-5 and to one side of each of the switches C4a, C4c, C4d and C4e of a relay CR-4.

It will be noted that the power remains connected to the above-noted elements of the electrical circuitry by way of the closed contact C2 of relay CR-2 as long as the pressure in pipe 10 is about 20 p.s.i. or more.

As previously mentioned, with full operating pressure in the source pipe 10, and with valve 13 in its illustrated position in which the low side 14a of the pressure differential switch is vented to atmosphere, switch blade PS-3 is held in its closed position against contact 23a. Consequently, power from line 19 is conducted through the pressure differential switch 14, wires 23, 24 and 25, closed contact C3b of relay CR-3 and wire 26 to signal lamps PL-5 in multiple on the console panel (FIG. 2) and the panel at the milking station (FIG. 3). The resulting energizing of these lamps indicates to the operator that the system is ready to begin a milking program for the cow in the stall at the milking station.

When this "Ready to Milk" signal has been given by lamps PL-5, the operator applies the teat cups to the cow in the milking stall and momentarily closes the "Start Milking" switch S at the milking station panel. Closure of switch S connects power from wire 23 through wire 27 to signal lamps PL-3 and PL-6 in multiple on the console panel and the milking station panel, thereby energizing these "Milking" lamps to indicate that the milking operation is in progress. At the same time, relay CR-4 is energized from wire 23 through switch S and wires 27 and 28. The resulting closure of switch C4b of relay CR-4 establishes a holding circuit for this relay by way of wires 28, 27 and 29, closed switch C4b, wires 25, 24 and 23, and the closed pressure differential switch 14. Thus, relay CR-4 and the "Milking" lamps PL-3 and PL-6 are held energized upon reopening of the starting switch S and until such time as switch blade PS-3 of the pressure differential switch is actuated to its open position.

Energizing of relay CR-4 connects power from closed contact C2 of relay CR-2 to:

(a) Solenoid SW2 by way of wire 22, closed contact C4e of relay CR-4 and wire 30, thereby opening the valve 6b to connect the milk receiver 3 to the vacuum pipe line 5;

(b) The milking timer 18 through wire 22, closed contact C4d of relay CR-4 and wire 31, thereby starting the timer 18;

(c) The chart propulsion motor of recorder 17 through wires 22 and 32, closed contact C4c of relay CR-4 and wire 33, thereby starting movement of the chart in this recorder; and (d) The solenoid SW3 through wires 22 and 34, closed contact C4a of relay CR-4 and wire 35, thereby closing valve 16 to close one of the two connections between pressure line 12 and the derivative unit 15.

It will be noted that at this point both the "Ready to Milk" lamps PL-5 and the "Milking" lamps PL-3 and PL-6 remain lighted.

As milk begins to flow continuously from the teat cups into the receiver 3, the resulting gradual forward tilting of balance beam 9 operates valve 11 to cause a corresponding gradual increase of pressure over the base pressure of 3 p.s.i. in pipe line 12. When the pressure in pipe line 12 reaches 3.5 p.s.i., switch PS-2 closes its contact P2 so as to energize relay CR-3 from wire 20 through contact P2 and wire 37. The results of this energizing of relay CR-3 are that:

(a) Solenoid SW1 is energized from wire 20 through closed contact C3a of relay CR-3 and wire 38, whereby valve 13 is actuated to disconnect the low side 14a of the pressure differential switch from atmosphere and connect it to pressure line 12 through branch 12a;

(b) The previously described circuit for energizing signal lamps PL-5 is opened at contact C3b of relay CR-3, thereby extinguishing these "Ready to Milk" lamps; and (c) Power from wire 20 is connected through closed contact C3c of relay CR-3 and wire 39 to one of the contacts of the now open switch C4f of relay CR-4.

As long as milk continues to flow into the receiver 3, the above-described circuitry will remain established.

When milk no longer flows into receiver 3, so that there is a cessation of the pressure increase in pressure line 12, the pressure at the outlet 15a of derivative unit 15 decreases relative to the pressure at the low side 14a of the pressure differential switch, due to the adjustable bleeder orifice 15b as previously described, with the result that the pneumatic pressures in the opposite sides 14a and 14b become equal and allow the biasing element 14c to actuate the switch blade PS-3 from its closed to its open position. This opening of the pressure differential switch 14 extinguishes the "Milking" lamps PL-3 and PL-6 and de-energizes the relay CR-4 by cutting off power to its holding switch C4b.

The results of this de-energizing of relay CR-4 are that:

(a) Solenoid SW2 is de-energized by opening of switch C4e of relay CR-4, thereby closing the vacuum connection to the milk receiver 3 as previously described;

(b) Timer 18 is de-energized by opening of switch C4d of relay CR-4;

(c) The chart propulsion motor of recorder 17 is de-energized by opening of switch C4c of relay CR-4;

(d) Solenoid SW3 is de-energized by opening of switch C4a of relay CR-4, thus reopening the valve 16 and re-establishing a dual connection from pressure line 12 to the derivative unit 15; and (e) Relay CR-5 is energized from wire 20 through the still closed contact C3c of relay CR-3, wire 39 and the now closed switch C4f of relay CR-4.

The above-described energizing of relay CR-5 causes closure of its contact C5, thereby energizing the "Milking Completed" lamps PL-4 on the console panel and on the panel at the milking station, respectively, through wire 22 and relay contact C5. With this indication that the milking operation is completed, the operator removes the teat cups from the cow, moves the hand-operated valve 6a to the position for venting the milk receiver 3 to atmosphere, and opens the hand-operated valve 8a leading from the receiver to the milk line 8. The milk in the receiver 3 then flows through milk line 8 to the bulk tank 8b.

As the milk flows from receiver 3, the decreasing weight of the receiver causes balance beam 9 to tilt counterclockwise (rearward) about fulcrum 9a. As a result, the valve 11 gradually reduces the pressure in line 12 until it returns to the initial or base pressure of 3 p.s.i. When the pressure in line 12 is reduced below 3.5 ps.i., pressure switch PS-2 opens its contact P2 and thereby de-energizes the relay CR-3.

The results of de-energizing relay CR-3 are that:

(a) Solenoid SW1 is de-energized by opening of relay switch C3a so that valve 13 is returned to its illustrated position for venting the low side of pressure differential switch 14 to atmosphere, whereby the switch blade PS-3 is returned to its closed position against contact 23a as previously described and re-energizes the "Ready to Milk" lamps PL-5; and (b) Relay CR-5 is de-energized by opening of relay switch C3c, thereby opening the contact C5 of relay CR-5 and extinguishing the "Milking Completed" lamps PL-4.

At this point, all electrical circuitry and pneumatic conditions have been returned to the status previously described when the "Ready to Milk" lamps PL-5 are energized. It will be understood that after the "Ready to Milk" lamps PL-5 have been re-energized and the milk receiver 3 has been completely emptied, the operator recloses the valve 8a and returns valve 6a to its illustrated position for connecting receiver 3 to the duct 6 in preparation for milking of the next cow; and the operations previously described which follow energizing of the "Ready to Milk" lamps PL-5 are then repeated.

When the milking of the herd of cows has been completed, the master switch M is opened to de-energize relay CR-1, whereby lamp PL-1 is extinguished and the supply of current is cut off from motor 7a of the vacuum pump and the motor of compressor 10a. Opening of switch M also cut off current from the switch blade PS-3 of pressure differential switch 14. As the pressure in pipe 10 reduces due to bleeding of compressed air, pressure switch PS-1 opens its contact P1, thereby isolating the circuit for energizing relay CR-2.

It will be understood that since the stylus of recorder 17 is positioned in accordance with the pressure in the pneumatic system or pipe line 12, the marking made by the stylus on the moving chart will indicate not only the final weight of milk in receiver 3 (which is a function of the maximum forward tilting of beam 9 and the corresponding maximum pressure attained in system 12) but also the rate at which the receiver is filled from the cow (which is a function of the rate of forward tilting of beam 9 and the corresponding rate of pressure increase in system 12). Also, it will be observed that this recording stylus is operated by a force or pressure substantially proportional to that exerted by the low side 14a of the pressure differential switch as the milking proceeds, since this low side is then connected through valve 13 to the pneumatic system 12.

The pressure switch PS-2 is in effect a member responsive to initial forward tilting of beam 9 for shifting valve 13 and thereby rendering the pressure differential switch 14 operable for the purpose of actuating the indicating element PS-3 in response to cessation of the forward tilting. Additionally, pressure switch PS-2 responds to substantial rearward tilting of beam 9 to render the pressure differential switch 14 inoperable for that purpose by returning valve 13 to its position for venting the low side 14a to atmosphere, this operation also resetting element PS-3 in preparation for its next actuation.

I claim:

1. In a milking system having an automatic milking unit including a set of teat cups and a milk receiver connected to the teat cups for receiving milk therefrom, the combination of a balance beam supporting said receiver and operable to tilt forward as milk from the teat cups fills the receiver, an indicating element to be actuated in one direction upon completion of the milking of an animal to which the teat cups are applied, and means operatively connected to the balance beam and the indicating element for actuating said element in response to substantial cessation of said forward tilting before the balance beam attains its maximum permissible forward tilting.

2. The combination according to claim 1, in which said means are operable to actuate the indicating element with a delayed action in response to substantial cessation of said forward tilting.

3. The combination according to claim 1, in which said means are operable to actuate the indicating element with a delayed action in response to substantial cessation of said forward tilting, said means including a member adjustable to vary the delay of said action.

4. The combination according to claim 1, in which said means include first and second devices exerting on the indicating element opposing forces which change in response to said forward tilting, said first device substantially maintaining its force upon cessation of said tilting, said second device substantially changing its force upon cessation of said tilting to cause one of said forces to overcome the other force and thereby actuate the indicating element.

5. The combination according to claim 1, in which said means include a pneumatic system, a valve operable by said forward tilting to change the pressure in said system in one direction, and means responsive to substantial cessation of said pressure change in said one direction for actuating said indicating element.

6. The combination according to claim 1, in which said means include a pneumatic system, a valve operable by said forward tilting to increase the pressure in said system, and means responsive to substantial cessation of said pressure increase for actuating said indicating element.

7. The combination according to claim 1, comprising also a vacuum line adapted for connection to said receiver during operation of the milking unit, and means under control of the indicating element for disconnecting the vacuum line from the receiver in response to said actuation of the indicating element.

8. The combination according to claim 1, comprising also a signal device operable in response to said actuation of the indicating element.

9. The combination according to claim 1, comprising also a recorder operatively connected to said beam for recording the maximum degree of said forward tilting, thereby indicating the weight of milk in the receiver at the end of a milking.

10. The combination according to claim 4, comprising also a recorder connected to said means and operable by a force substantially proportional to the force exerted by said first device.

11. The combination according to claim 1, comprising also a timer operable under control of said indicating element at the start of the milking by said unit, the indicating element acting upon said actuation thereof to arrest operation of the timer.

12. The combination according to claim 1, comprising also a recorder operatively connected to said beam for recording the maximum degree of said forward tilting, thereby indicating the weight of milk in the receiver at the end of a milking, and a timer operable under control of said indicating element at the start of the milking by said unit, the indicating element acting upon said actuation thereof to arrest operation of the timer.

13. The combination according to claim 1, in which said means are normally inoperative and include a member for rendering said means operative in response to initial forward tilting of the balance beam.

14. The combination according to claim 1, in which said means include a member responsive to substantial rearward tilting of the balance beam for rendering said means inoperative.

15. The combination according to claim 1, in which said means include a member responsive to substantial rearward tilting of the balance beam for rendering said means inoperative, said member being movable to render said means operative in response to initial forward tilting of the balance beam.

16. The combination according to claim 1, in which said means include a member responsive to substantial rearward tilting of the balance beam for re-setting the indicating element after said actuation thereof.

17. The combination according to claim 1, in which said means include a pneumatic pressure source, a pipe line, a valve forming a connection between said source and pipe line and operable by said forward tilting of the beam to vary said connection and thereby increase the pressure in said pipe line, a pressure differential mechanism including first and second devices exerting opposing forces on said indicating element, said first device being connected to the pipe line and exerting a first force tending to actuate the indicating element and which increases with said pressure increase, and a derivative unit separately connected to said pipe line and pressure source and having a pneumatic outlet leading to said second device, the derivative unit being operable to maintain the force exerted by said second device at a higher value than said first force except in response to substantial cessation of said pressure increase in the pipe line, whereby said first device actuates the indicating element in response to said cessation.

18. The combination according to claim 17, wherein said means also include a second valve through which said first device is connected to the pipe line, and a member responsive to a pressure in the pipe line below a predetermined value for actuating the second valve to disconnect said first device from the pipe line and connect said first device to atmosphere.

19. The combination according to claim 1, comprising also a "ready to milk" indicator, said means including a member responsive to rearward tilting of the beam substantially to a starting position for operating said indicator.

20. In a milking system having an automatic milking unit including a set of teat cups and milk receiver means communicating with the teat cups for receiving milk therefrom, the combination of a balance beam supporting said receiver means and operable to tilt as said means continue to receive milk from the teat cups, an indicating element to be actuated in one direction upon completion of the milking of an animal to which the teat cups are applied, and means operatively connected to the balance beam and the indicating element for actuating said element in response to substantial cessation of said tilting and while the balance beam is operable to continue said tilting.

References Cited
UNITED STATES PATENTS

| | | | |
|---|---|---|---|
| 1,662,523 | 3/1928 | Light | 177—72 |
| 2,412,270 | 12/1946 | Johnston | 177—245 X |
| 2,784,932 | 3/1957 | Poitras. | |
| 2,868,167 | 1/1959 | Clark | 119—14.05 |
| 2,998,722 | 9/1961 | Jaquith | 177—16 X |
| 3,187,719 | 6/1965 | Jones | 119—14.46 |

RICHARD B. WILKINSON, *Primary Examiner.*

G. H. MILLER, Jr., *Assistant Examiner.*